US010044934B2

(12) United States Patent
Barbier (10) Patent No.: US 10,044,934 B2
(45) Date of Patent: Aug. 7, 2018

(54) METHOD FOR CAPTURING AN IMAGE WITH DARK CURRENT REDUCTION AND LOW POWER CONSUMPTION

(71) Applicant: E2V SEMICONDUCTORS, Saint Egreve (FR)

(72) Inventor: Frédéric Barbier, Fontanil-Cornillon (FR)

(73) Assignee: TELEDYNE E2V SEMICONDUCTORS SAS, Saint-Égrève (FR)

( * ) Notice: Subject to any disclaimer, the term of this patent is extended or adjusted under 35 U.S.C. 154(b) by 0 days.

(21) Appl. No.: 15/124,894

(22) PCT Filed: Mar. 5, 2015

(86) PCT No.: PCT/EP2015/054651
§ 371 (c)(1),
(2) Date: Sep. 9, 2016

(87) PCT Pub. No.: WO2015/135836
PCT Pub. Date: Sep. 17, 2015

(65) Prior Publication Data
US 2017/0041539 A1    Feb. 9, 2017

(30) Foreign Application Priority Data
Mar. 11, 2014   (FR) ...................... 14 51974

(51) Int. Cl.
*H04N 5/232* (2006.01)
*H04N 5/378* (2011.01)
*H04N 5/361* (2011.01)

(52) U.S. Cl.
CPC ......... *H04N 5/23241* (2013.01); *H04N 5/361* (2013.01); *H04N 5/378* (2013.01)

(58) Field of Classification Search
None
See application file for complete search history.

(56) References Cited

U.S. PATENT DOCUMENTS 8,163,591 B2   4/2012   Park et al.
8,436,674 B1   5/2013   Standley et al.
(Continued)

FOREIGN PATENT DOCUMENTS

EP    1223623 A2      7/2002
WO    2012/053127 A1  4/2012

OTHER PUBLICATIONS

Bongki Mheen et al., Negative Offset Operation of Four-Transistor CMOS Image Pixels for Increased Well Capacity and Suppressed Dark Current, IEEE Electron Device Letters, Apr. 2008, pp. 347-349, vol. 29, No. 4.
(Continued)

*Primary Examiner* — Roberto Velez
*Assistant Examiner* — Quan Pham
(74) *Attorney, Agent, or Firm* — Pilloff & Passino LLP (57) ABSTRACT

The invention relates to a method for capturing an image in an image sensor with a matrix of rows and columns of active pixels, powered between a first power supply terminal at zero potential (Vss) and a second power supply terminal at a positive power supply potential (Vdd). Each pixel comprises a photodiode and a gate for transferring the photo-generated charges to a charge storage node. A negative potential (VNEG) is applied to the transfer gate by a charge pump during the charge integration time and it receives a transfer control signal (TRA) common to all the pixels during a transfer time window. The transfer or reset control signal successively comprises at least one first phase during which it goes from the negative potential (VNEG) to a positive transfer potential, a second phase during which it goes from the positive transfer potential to the zero potential (Continued)

supplied by the first power supply terminal, a third phase of finite duration during which it remains at the zero potential, and a fourth phase in which it goes back from the zero potential to the negative potential supplied by the charge pump. Going through the power supply potential limits the current demands in the charge pump which has to re-establish the negative potential VNEG at the end of the transfer.

4 Claims, 4 Drawing Sheets

(56) References Cited

U.S. PATENT DOCUMENTS

| | | | |
|---|---|---|---|
| 8,792,037 B2* | 7/2014 | Hasegawa | H04N 5/3742 |
| | | | 348/308 |
| 2006/0097296 A1 | 5/2006 | Nam | |
| 2008/0122941 A1 | 5/2008 | Kikuchi et al. | |
| 2008/0192135 A1* | 8/2008 | Yamashita | H04N 5/361 |
| | | | 348/308 |
| 2008/0296630 A1 | 12/2008 | Hynecek et al. | |
| 2009/0219418 A1 | 9/2009 | Fujita | |
| 2009/0251582 A1* | 10/2009 | Oike | H01L 27/14609 |
| | | | 348/308 |
| 2012/0320245 A1* | 12/2012 | Hasegawa | H04N 5/357 |
| | | | 348/300 |

OTHER PUBLICATIONS

International Search Report for PCT/EP2015/054651, dated Jun. 5, 2015.

* cited by examiner

Fig. 6

METHOD FOR CAPTURING AN IMAGE WITH DARK CURRENT REDUCTION AND LOW POWER CONSUMPTION

FIELD

The invention relates to electronic image sensors with active pixels.

BACKGROUND

These sensors use an array of pixels in rows and in columns, with a photosensitive element and several transistors in each pixel.

Figure 1:
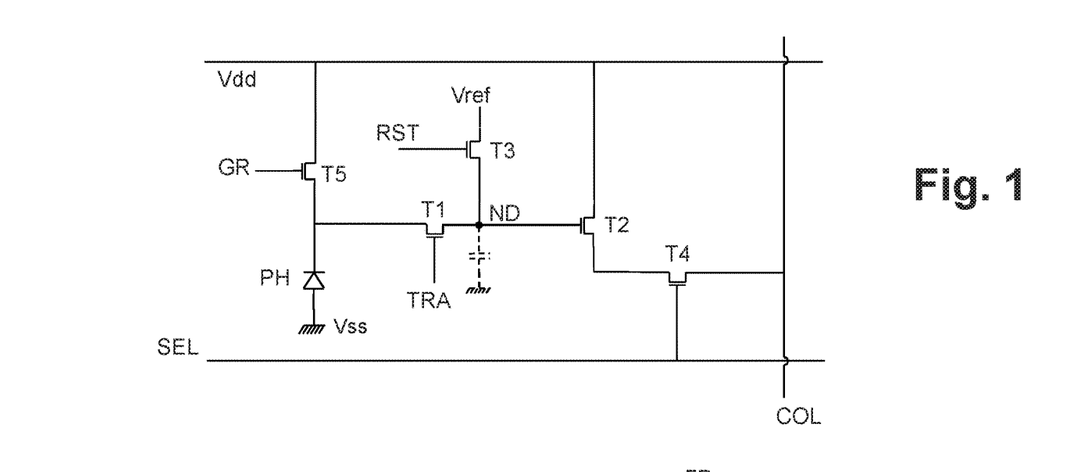
FIG. 1, already described, shows an electrical circuit diagram of a conventional pixel with five transistors.

One advantageous composition of the pixel is a composition such as shown in FIG. 1, with:
- a self-biased (or 'pinned') photodiode PH,
- a charge storage node ND, which is the equivalent of a capacitor,
- a transfer transistor T1 for isolating the photodiode from the storage node or, on the contrary, allowing a transfer of charges from the photodiode to the storage node with a view to measuring the potential of the storage node after this transfer,
- a transistor T2 for reading charges, configured in voltage follower mode, having its gate connected to the storage node in order to allow the potential of the storage node to be transferred onto the source of the transistor,
- a transistor T3 for resetting the storage node, allowing the potential of the storage node to be set at a reference value for measuring this reference potential, with a view to a differential measurement of the potentials of the storage node in the presence of charges coming from the photodiode and in the absence of charges coming from the photodiode;
- a pixel selection transistor T4, controlled by a row addressing conductor SEL, allowing the potential of the source of the read transistor T2 to be transferred onto a column conductor COL; the row conductor SEL is common to all the pixels of the same row of pixels; the column conductor COL is common to all the pixels of the same column of pixels,
- lastly, optionally, an additional transistor T5 which can have one and/or the other of the two following functions: evacuate the excess electrical charges in the photodiode towards an anti-blooming drain in the case of too intense an illumination, or else reset the potential of the photodiode by completely emptying the accumulated charges towards a drain in order for it to recover its empty potential prior to beginning a new period of integration; the transistor T5 is optional and allows a start of integration time common to all the pixels to be defined.

It will be noted that the term "transistor" is used in order to facilitate the understanding in terms of electrical circuit diagram such as the diagram in FIG. 1. However, in the physical composition of the pixel, these transistors are not necessarily formed in a conventional manner, independently of the other elements of the pixel, with a source region, a drain region, a channel region separating the source from the drain, and an isolated gate on top of the channel. In the real physical composition of the pixel, certain transistors are in reality formed essentially by an isolated gate to which a control potential can be applied. Thus, for example, the transfer transistor T1 is formed by a transfer gate isolated from the substrate, lying over a region which is situated between the photodiode PH and a diffusion of the N+ type forming the charge storage node; the source of the transistor T1 is the photodiode; the drain of the transistor is the charge storage node. Similarly, the transistor T5 is formed using an isolated gate, adjacent on one side to the photodiode (forming the source of the transistor), and on the other to a charge evacuation drain (forming the drain of the transistor).

In the sensors of the prior art, the existence of what is generally referred to as a dark current, in other words a flow of stray charges even in the absence of illumination, whereas the absence of illumination should lead to an absence of charges. These stray charges reduce the signal/noise ratio and are particularly detrimental when low lighting conditions are measured.

A part of the dark current is due to the interface defects between the region N of the photodiode and an insulating silicon oxide which surrounds the photodiode in order to insulate it from the neighbouring photodiodes. This insulating oxide, generally known by the acronym STI (for "Shallow Trench Isolation") is contained within a surface trench which surrounds the whole of the photodiode apart from the passage that needs to be reserved for transferring the charges from the photodiode (transistor T1) to the storage node and except for the passage that may need to be reserved for emptying the charges from the photodiode during a reset operation (transistor T5). The interface defects trap electrons; these electrons are subsequently liberated and attracted towards the storage node at the moment of the transfer of charges from the photodiode to the storage node; for this reason they will be considered as useful charges resulting from the illumination whereas they are in reality stray charges not resulting from the illumination.

In order to limit this effect as far as possible, the idea of interposing a region of type P between the photodiode region (of type N) and the trench filled with insulator has already been proposed. This P region is in contact with the active layer of silicon of type P in which the photodiode is formed. It surrounds the N region of the photodiode and prevents the latter from being in direct contact with the isolation trench. It serves as a passivation layer which reacts with the isolation trench so as to neutralize the stray charges. However, in an industrial process, it is not possible to place a region of type P under the gates (which are made of polycrystalline silicon) of the transfer transistor T1 or of the transistor T5 when it is present; the reason for this is that the implantation of type P must in practice be carried out after the formation of the gates and that it is therefore not possible to implant an impurity of type P under the gates; the isolation trenches made of silicon oxide extend however under the gates and it would have been preferable to passivate them here by a P region as elsewhere.

As a consequence, the semiconductor regions under the gates of the transistors T1 and T5 remain directly in contact with silicon oxide and are likely to generate a detrimental dark current, on the principle of what has been presented hereinabove.

The gate of the transfer transistor T1 could be maintained at a slightly negative potential (around −0.7 volts) instead of a zero potential during the integration of photogenerated charges. This voltage would allow holes to be attracted and accumulated under the gate; the electrons trapped at the oxide/silicon interface then recombine with these mobile holes and disappear, thus eliminating the risk that undesirable electrons go towards the storage node during the transfer of charges from the photodiode to the storage node.

However, in order to produce this negative voltage, whereas the integrated circuit is powered between 0 volts and a positive voltage of 3 to 5 volts, a charge pump must be used. Charge pumps have a low efficiency, lower than 50% and sometimes even lower than 30%. They therefore consume a current much higher than the current that they have to supply.

In one mode of operation of the sensor referred to as "global shutter" mode, in other words with a global exposure time, the transfer phase is simultaneous for all the pixels of the sensor. All the transfer gates of the pixel array are activated at the same time for transferring the charges from the photodiodes into the storage nodes. For a sensor with 2 million pixels, the current demand in the charge pump in order to return to a potential of −0.7 volts at the moment when the transfer pulse ends may exceed 80 milliamps, and this is with the proviso that the control pulse fall time is forced to at least 300 nanoseconds so that the transition is not too abrupt. The 80 milliamps supplied by the charge pump for discharging the equivalent capacitance of all the transfer gates connected in parallel can correspond to an overall current consumption of 250 milliamps owing to the low efficiency of the charge pump.

SUMMARY

In order to solve the problem of the dark current without creating a difficulty of very high current demand at the moment of the switching of the transfer gate from the high state to the low state or vice versa, the idea of the invention is to carry out this switching to the low state in three separate stages which are a passage from a positive voltage to zero (potential of one power supply terminal of the sensor) then a stabilization at zero, then a passage from zero to a negative voltage supplied by a charge pump. The majority of the charges accumulated in the transfer gate during the transfer pulse then firstly discharge into the power supply terminal at zero volts (ground) and not into the charge pump; the latter only provides the passage of the gates of the transfer transistors from 0 volts to the small negative voltage (−0.7 volts for example).

Consequently, the invention provides a method for capturing an image in an image sensor with a matrix of rows and columns of active pixels, powered between a first power supply terminal at zero potential and a second power supply terminal at a positive power supply potential, in which each pixel comprises a photodiode formed within an active semiconductor layer at the zero reference potential, a charge transfer gate for transferring the charges generated by the light from the photodiode to a charge storage node, and optionally a gate for resetting the potential of the photodiode, the method comprising a step for global transfer of the charges from the photodiodes of all the pixels of the matrix to the corresponding storage nodes and optionally a step for resetting all the photodiodes, characterized in that a negative potential is applied to the transfer gate and/or the reset gate by a charge pump during the major part of the charge integration time and it receives a transfer or reset control signal common to all the pixels during a transfer time window, the transfer or reset control signal successively comprising at least a first phase during which it goes from the negative potential to a positive transfer potential, a second phase during which it goes from the positive transfer potential to the zero potential supplied by the first power supply terminal, a third phase of finite duration during which it remains at the zero potential, and a fourth phase in which it goes back from the zero potential to the negative potential supplied by the charge pump.

The charge pump is used to maintain the negative potential during the integration time, but it is not subjected to a high current demand in this phase. It is not used during the second and the third phase. Then, it is used to drive the potential from zero to the negative potential at the end of the transfer control signal, but the difference in potential is then lower than the difference that exists between the positive potential of the first phase and the final negative potential. The current demand due to the capacitive discharge is accordingly reduced. The gain on the current demand is in the ratio of these two differences in voltage.

For example, the positive potential is 3.3 volts and the negative potential is of −0.7 volts. The gain in current consumption is in the ratio 4 volts/0.7 volts being around 5.7.

The passage from the positive potential to the zero potential is not carried out by the charge pump, but the capacitive discharge current flows directly into the power supply terminal at the zero potential. The low efficiency of the charge pump is therefore not an issue in this phase.

In one embodiment, only the falling edge of the transfer pulse (or reset pulse) undergoes a phase for passage through the zero potential supplied directly by the first power supply terminal.

In another embodiment, for reasons of symmetry, the same shape is given to the rising edge of the transfer pulse, with a rise phase from the negative potential supplied by the charge pump to the zero potential supplied by the first power supply terminal, a phase of finite duration at this potential, and a rise phase from the zero potential to the positive potential which provides the transfer of charges.

Sensors envisaging the application of a negative voltage to the transfer gate are described in the following publications: US2008296630, U.S. Pat. No. 8,163,591, US 2009/0219418, and Bongki Mheen, Young-Joo Song, and Albert J. P. Theuwissen, Negative Offset Operation of Four-Transistor CMOS Image Pixels for Increased Well Capacity and Suppressed Dark Current.

Other features and advantages of the invention will become apparent upon reading the detailed description that follows and which is presented with reference to the appended drawings.

DETAILED DESCRIPTION

Figure 2:
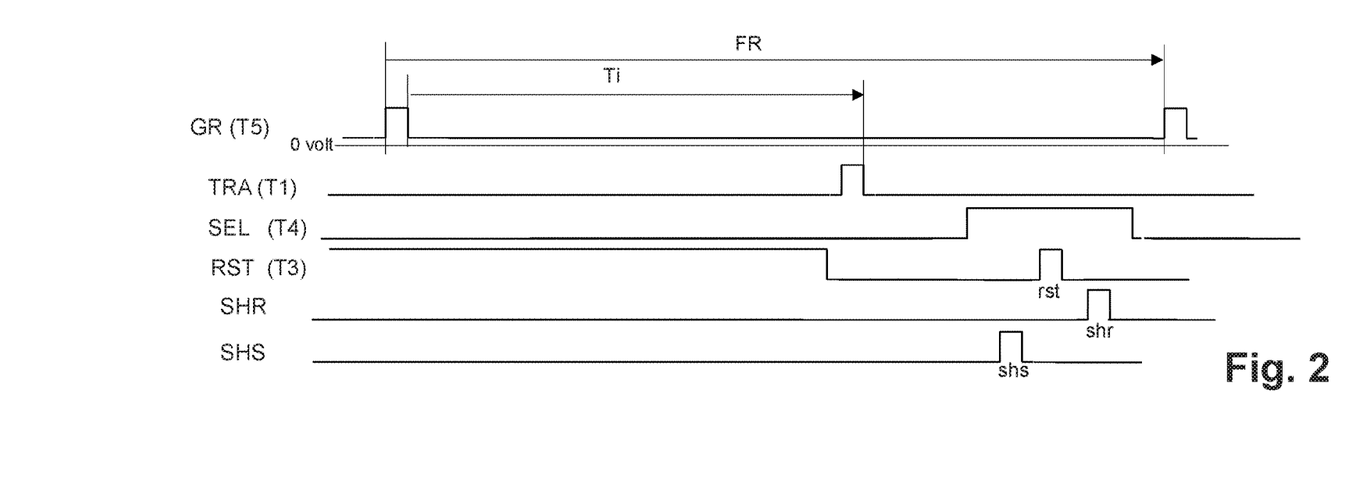
FIG. 2 shows a timing diagram of the general operation of the pixel.

FIG. 2 shows the timing diagram of the conventional operation of a pixel with 5 transistors using the fifth transistor to trigger the start of the integration period (operation in the mode referred to as "global shutter" mode). The operation in "global shutter" mode would be possible in the absence of a transistor T5, but the integration time would not be adjustable, and it would be equal to the period FR.

The operation is periodic with a frame period FR. The frame begins with a reset pulse GR applied to the gate of the transistor T5 for all the pixels simultaneously when such a transistor is provided. The pulse empties the charges which have been integrated by the light in the photodiodes. The end of the pulse GR marks the start of the integration time Ti, common to all the pixels. The end of this time will be defined by the end of a transfer pulse TRA applied to the gate of the transfer transistor T1; this pulse, common to all the pixels in the global shutter mode, transfers the integrated charges from the photodiode to the storage node ND.

During the integration time, before the pulse TRA, a reset potential level (line RST) is applied to the gate of the transistor T3 in order to empty the charges which may be contained in the storage node. This signal is interrupted necessarily prior to the transfer pulse.

After the integration time Ti, the pixels are read row by row, a selection signal (line SEL) being successively applied to each of the rows in order to define the time when it is read. This signal is shown for only one row in FIG. 2; it is applied to the gate of the transistor T4. The reading is carried out in a read circuit not shown, situated at the foot of each column of pixels and connected to the respective column conductor COL. The read circuit notably comprises a sampling circuit controlled by pulses shs and shr used to respectively sample the useful potential level of the column conductor after the transfer pulse TRA and the potential level after resetting. The measurement is made by difference between the two samples at each period.

The read phase for a given row, defined by the pulsed signal SEL applied to this row, successively comprises the generation of a sampling pulse shs, the generation on the gate of the transistor T3 of a pulse rst for resetting the storage node of the pixels of the row in question, and the generation of a sampling pulse shr. The difference of the sampled signals is converted by an analogue-digital converter (not shown).

In the prior art, the transfer signal TRA and the signal GR, where required, for resetting the photodiodes, are common to all the pixels and are usually pulses starting from the reference voltage of zero volts which is the potential of the active semiconductor layer in which the photodiodes are formed; these pulses take a positive value for a short time and they allow the charges stored in the photodiode to be emptied.

Figure 3:
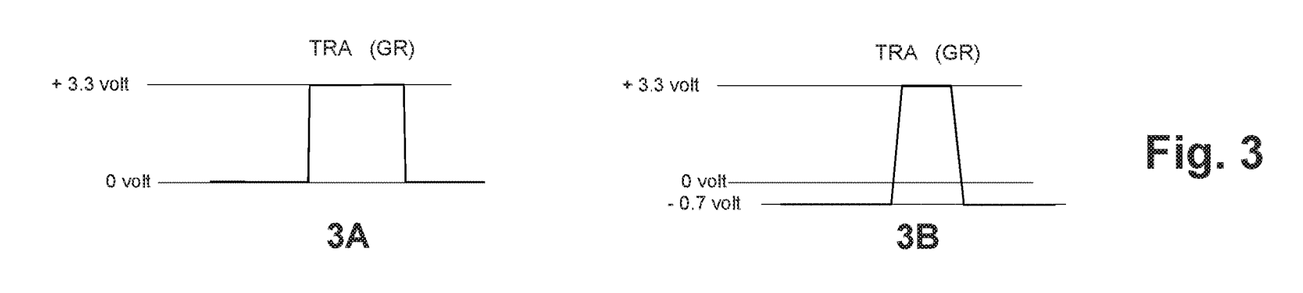
FIGS. 3A and 3B show one possible example of shape according to the invention of the transfer or reset control pulses for the photodiodes.

The transfer control or reset control signal then has the rectangular shape shown in FIG. 3A going from zero to a positive transfer potential, which can be Vdd when the sensor is powered between two power supply terminals Vss (zero) and Vdd (positive). Vdd is typically 3.3 volts.

As has been explained hereinabove, the shape of the pulses could be that in FIG. 3B if the control signal is held at a slightly negative voltage (of −0.7 volts for example) during the integration phase and if the rising and falling edges are forced to have a minimum duration in order to prevent too high current demands. The minimum duration of the edges is for example 300 nanoseconds and the total duration of the signal TRA or GR can be around 1 microsecond.

Figure 4:
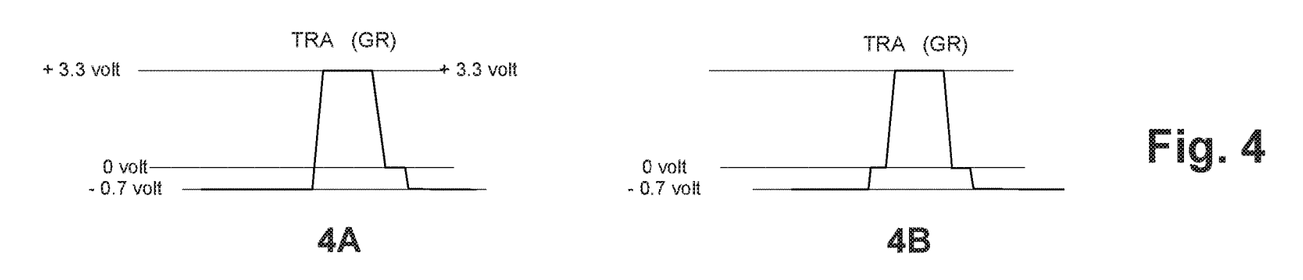
FIGS. 4A and 4B show theoretical shapes of transfer or reset control pulses for the photodiodes according to the invention.

According to the invention, a different shape is given to the profile of the transfer or reset control signal, as shown in FIG. 4A, which imposes a passage of the signal for a finite duration through the power supply zero potential, between the moment when this signal is at its high positive level and the moment when it returns to its low negative level. The transfer or reset control signal may therefore be decomposed into at least a first phase, during which it goes from the negative potential to a positive transfer potential (and remains there preferably for a period of a few hundred nanoseconds), a second phase during which it goes from the positive transfer potential to the zero potential supplied by the first power supply terminal, a third phase of finite duration during which it remains at the zero potential, and a fourth phase in which it goes back from the zero potential to the negative potential supplied by the charge pump.

The period for which it remains at the zero potential can be short. It must be sufficient for allowing the discharge down to zero of the gate capacitances of all the transistors of the matrix; around a hundred nanoseconds will suffice.

Optionally, for reasons of symmetry and of simplification of the formation of the signal, a passage through the power supply zero potential for a finite duration between the moment when the signal is at its low negative level and the moment when it reaches its high positive level is also imposed during the first phase, as is shown in FIG. 4B.

A progressive rising slope up to positive potential is preferably (but not necessarily) provided in the first phase in order to limit the current demands; similarly, a progressive falling slope is preferably provided from the positive potential in the second phase. The rising and falling edges can then last between 100 and 400 nanoseconds. A similar falling or rising slope may also, optionally, be provided in the fourth phase (fall from zero to −0.7 volts), and also in the rise from the negative potential to the zero potential.

Figure 5:
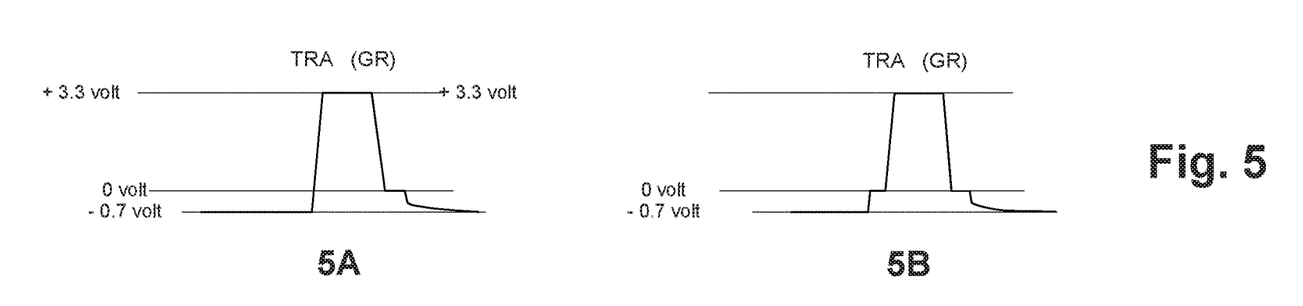
FIGS. 5A and 5B show the real shape of the control pulses, taking into account the recovery time of the charge pump.

The shapes of control signal shown in FIGS. 4A and 4B may be used for the transfer control signal TRA and for the reset control signal GR when a reset transistor T5 is provided and is activated in order to define the start of the integration time. These shapes may also be used for only one of these two signals, the other not comprising a phase for holding at the power supply zero potential. The signal shapes shown in FIGS. 4A and 4B are theoretical shapes shown in order to simplify the explanations. The real shapes are more usually those that are shown in FIGS. 5A and 5B as will be explained hereinbelow, owing to the fact that the voltage produced by the charge pump (theoretically −0.7 volts for example) takes a certain time to return to its nominal value starting from the moment when it is turned on.

Figure 6:
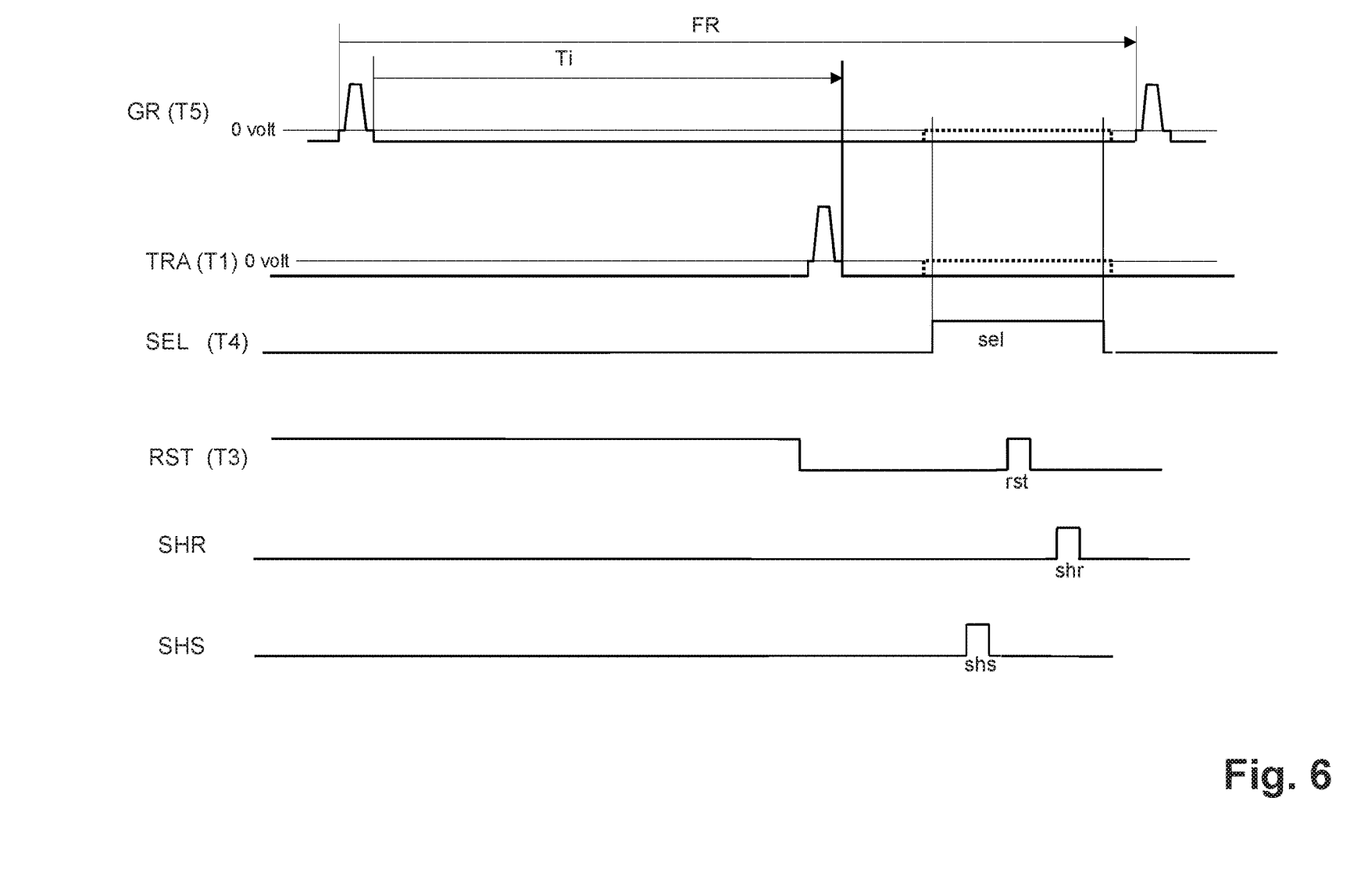
FIG. 6 shows a timing diagram of the operation of the sensor according to the invention.

FIG. 6 shows the general timing diagram of operation of the sensor. It is similar to that in FIG. 2 and the explanations are the same, the differences being the following: here, the low potential of the signals TRA and GR (or at least one of the two) is negative during the charge integration time; and the shape of the transfer control signal and of the reset signal comprises, at least for the fall from the positive potential towards the low negative potential, a plateau of finite (non-zero) duration at the zero potential as described with reference to FIGS. 4A and 4B. The duration of the transfer (or reset) control signal can be of the order of 1 millisecond.

It will be noted that, on the diagram in FIG. 6, the low potential of the transfer control signal is negative for the whole of the charge integration period and remains low during the reading of the charges (in other words during the signals SEL for selection of the successive rows). However, as is shown by a dotted line, the transfer control signal could be reset to the zero potential during the read phases. Since the charge pumps are not solicited during the reading, no interference noise is introduced onto the storage node, associated with spurious signals from high-frequency switching of the pump. In FIG. 6 as in FIG. 2, only the selection signals sel and reading signals shs, rst, shr are shown for a single row; these signals are repeated successively in order to carry out the selection and the reading of the various rows.

Figure 7:
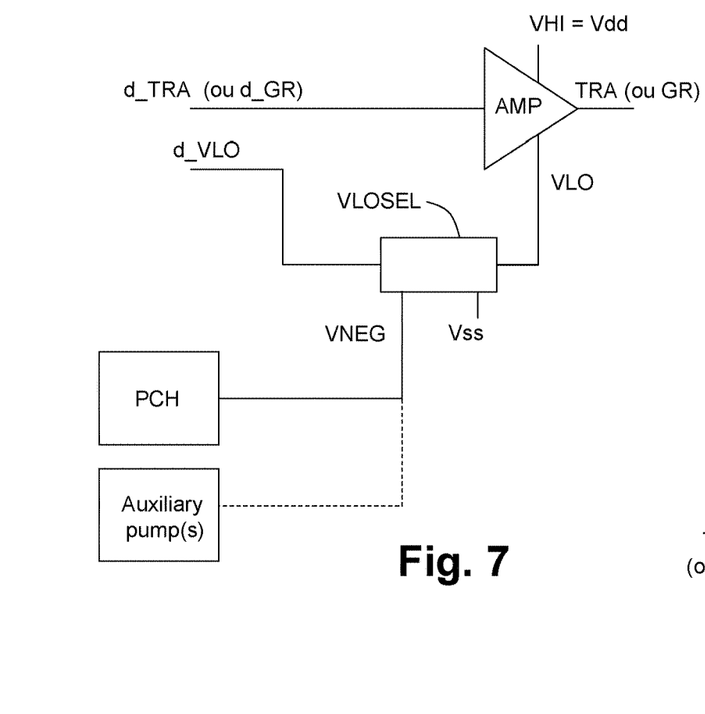
FIG. 7 shows a circuit for generating the transfer or reset signal.

FIG. 7 shows a row control circuit connecting the gates of the transfer transistors T1 of all the pixels of the same row of pixels of the sensor. This circuit would be the same for controlling a row connecting the gates of the reset transistors T5 of one row of pixels. Each control circuit essentially comprises a power amplifier AMP and an associated voltage selector. The amplifier AMP is capable of supplying a charge current for the gate capacitances of all the transistors of the row, typically a maximum current of 50 to 100 microamps, the fact that the output current of the amplifier is limited defines a rising slope for the signal applied to the gates of the row; for example, a current limited to 100 microamps defines a rise or fall time of around 250 nanoseconds if the row capacitance is 6 picofarads.

The amplifier AMP is powered between a high voltage VHI, which can be the voltage Vdd (3.3 volts for example) supplied directly by a general positive power supply terminal of the sensor, and a low voltage VLO which is supplied by the voltage selector VLOSEL.

The voltage selector receives both the low power supply potential Vss supplied by a general power supply terminal at the zero potential, and a negative potential VNEG supplied by a charge pump PCH, at its output, it supplies one or the other of the potentials Vss and VNEG depending on the logic signal that it receives on its control input d_VLO. The amplifier is therefore powered either between Vdd and Vss, hence by the two power supply terminals, or between Vdd and VNEG, hence between the positive power supply terminal and the output of the charge pump, according to the high or low state, respectively, of the signal d_VLO. The charge pump is common to all the control circuits if these circuits are each assigned to one respective row of pixels.

The amplifier AMP furthermore receives a logic control pulse d_TRA on its input, which is supplied by a sequencer (not shown) and which establishes the various cyclical signals for operation of the sensor. The signal d_TRA represents the order to transfer at the end of an integration time. Its value is a low logic level 0 for the whole integration time; it goes to the high logic level 1 only for the total duration of the transfer signal shown in FIGS. 4A and 4B. When d_TRA is at the low level, the amplifier supplies the voltage VLO, in other words either Vss or VNEG, at its output. When d_TRA is at the high logic level, the amplifier supplies the voltage VHI, in other words Vdd, at its output.

The same explanations are applicable for the signal GR.

The sequencer furthermore supplies the logic signal d_VLO intended for controlling the voltage selector VLOSEL. When the signal d_VLO is at the low level, the voltage selector supplies the negative voltage VNEG of −0.7 volts to the amplifier. When d_VLO is high, the selector supplies Vss.

Figure 8:
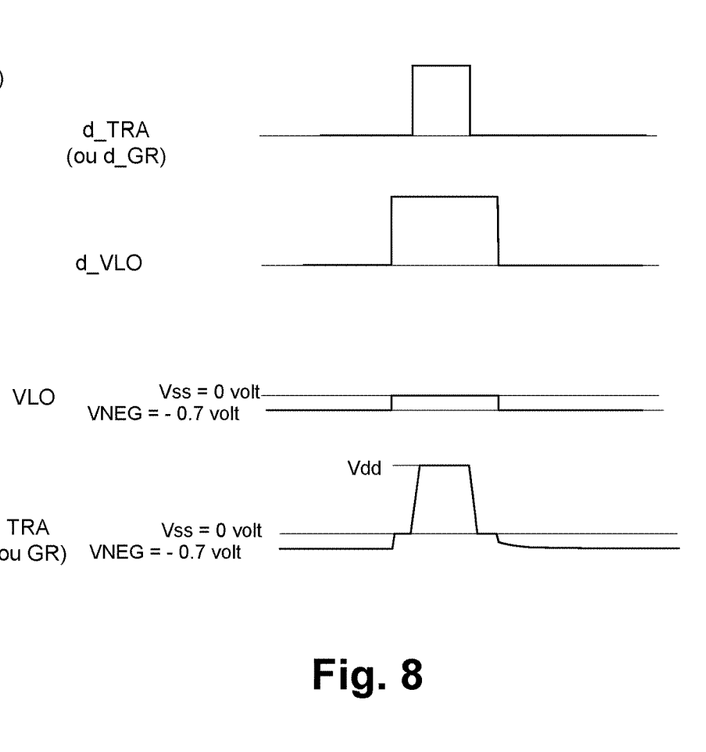
FIG. 8 shows the signals used in the circuit in FIG. 7.

FIG. 8 shows the control signals d_VLO and d_TRA, and the transfer control signal TRA which results from these.

When d_VLO and d_TRA are at the low level, the charge pump supplies VNEG to the amplifier and the latter supplies VNEG to the row of gates. This is the case for the whole integration time Ti.

When d_VLO goes to the high level, the amplifier receives the voltage Vss from the low power supply terminal of the sensor. The amplifier supplies Vss on its output.

When d_TRA subsequently goes to the high logic level, the output TRA of the amplifier goes to Vdd with a non-zero rise time defined by the maximum possible current that can be supplied at the output of the amplifier. TRA subsequently remains at Vdd for the duration of the signal d_TRA. It goes back down to the level Vss at the end of the signal d_TRA with a non-zero fall time defined by the maximum possible current that can be absorbed at the input of the amplifier. Finally, it can be seen that the signal TRA goes slowly back to the negative voltage VNEG at the end of the signal d_VLO. This slow return is due to the fact that the voltage VNEG is supplied by the charge pump; the latter supplies a voltage which only progressively reaches the nominal negative voltage which is requested of it because it is charged through all the amplifiers by all the gates of the rows of the sensor.

If it is desired to accelerate the return of the negative voltage to its nominal value, for example −0.7 volts, one or more other charge pumps (e.g., auxiliary pumps in FIG. 7) can be provided in parallel with the charge pump PCH which are only brought into operation if the voltage VNEG falls in absolute value beyond a limited value. The main charge pump PCH holds the level at −0.7 volts during the integration time, the other pump or pumps only operating at the end of the signal d_VLO. The outputs of the charge pumps are connected in parallel. A voltage regulator placed at the output of the assembly in parallel compares the output voltage of the main charge pump with a setpoint value. If the difference is too large, the regulator supplies a signal to bring the auxiliary charge pumps into operation.

Everything that has just been said with regard to the signal TRA with reference to FIGS. 7 and 8 is also applicable to the reset signal GR. If the transistor T5 has to provide an anti-blooming function during the integration time, it is desirable for the negative voltage applied to its gate for this period of time to impose in the semiconductor a potential barrier slightly lower than the potential barrier created at the same moment under the gate of the transfer transistor. This can be achieved by providing for the threshold voltage of the transistor T5 to be lower than the threshold voltage of the transistor T1. This may be obtained by having different channel dopings or different thicknesses of gate oxide for these two transistors. It may also be provided for the negative voltage applied to the gate of the transistor T5 during the integration phase to be slightly higher (less negative) than that applied to the gate of the transistor T1. However, it may also be the case that the transistor T5 is not used as an anti-blooming transistor and that auxiliary anti-blooming means are provided.

The invention claimed is:

1. A method for capturing an image in an image sensor with a matrix of rows and columns of active pixels, powered between a first power supply terminal at a zero potential and a second power supply terminal at a positive potential, in which each pixel comprises a photodiode formed within an active semiconductor layer at the zero potential, a charge transfer gate for transferring charges generated by light from the photodiode to a charge storage node, the method comprising:
    globally integrating charges by the photodiodes of all the pixels of the matrix; and then
    globally transferring the charges from the photodiodes of all the pixels of the matrix to the corresponding storage nodes,
    wherein
    a negative potential is applied to the transfer gate by a charge pump during a major part of a charge integration time at the global integration and a transfer control signal, which is applied to all the pixels during a transfer time window at the global transfer, includes at least a first rising phase during which a same shape is given to a rising edge of a transfer pulse as to a falling edge of the transfer pulse, with the first rising phase from the negative potential supplied by the charge pump to the zero potential supplied by the first power supply terminal, a phase of finite duration at the zero potential, and a further rise phase from the zero potential to the positive potential which provides the transfer of charges, wherein the transfer control signal remains at the positive potential during a pulse duration, then successively a second falling phase during which the transfer control signal goes from the positive potential to the zero potential supplied by the first power supply terminal, a third phase of finite duration during which the transfer control signal remains at the zero potential, wherein the charge pump is not used during the second falling phase and the third phase, and a fourth falling phase in which the transfer control signal goes back from the zero potential to the negative potential supplied by the charge pump.

2. The method of claim 1, further comprising, in the fourth falling phase, activating at least one auxiliary charge pump for assisting the charge pump in supplying a negative voltage.

3. A method for capturing an image in an image sensor with a matrix of rows and columns of active pixels, powered between a first power supply terminal at a zero potential and a second power supply terminal at a positive potential, in which each pixel comprises a photodiode formed within an active semiconductor layer at the zero potential, a charge transfer gate for transferring charges generated by light from the photodiode to a charge storage node, and a reset gate for resetting the potential of the photodiode, the method comprising:

globally integrating charges by the photodiodes of all the pixels of the matrix; then globally transferring the charges from the photodiodes of all the pixels of the matrix to the corresponding storage nodes; and resetting all the photodiodes, wherein a negative potential is applied to the transfer gate and/or the reset gate by a charge pump during a major part of a charge integration time at the global integration, and a control signal, which is applied to all the pixels during a transfer time window at the global transfer and/or a reset time window at the resetting, includes at least a first rising phase during which a same shape is given to a rising edge of a transfer pulse as to a falling edge of the transfer pulse, with the first rising phase from the negative potential supplied by the charge pump to the zero potential supplied by the first power supply terminal, a phase of finite duration at the zero potential, and a rise further phase from the zero potential to the positive potential which provides the transfer of charges, wherein the control signal remains at the positive potential during a pulse duration, then successively a second falling phase during which the control signal goes from the positive transfer potential to the zero potential supplied by the first power supply terminal, a third phase of finite duration during which the control signal remains at the zero potential, wherein the charge pump is not used during the second falling phase and the third phase, and a fourth falling phase in which the control signal goes back from the zero potential to the negative potential supplied by the charge pump.

4. The method of claim 3, further comprising, in the fourth falling phase, activating at least one auxiliary charge pump for assisting the charge pump in supplying a negative voltage.

* * * * *